(No Model.)
J. R. ROBINSON.
Mode of Uniting Metal Plates by Riveting.
No. 230,964.    Patented Aug. 10, 1880.
Fig. 1.
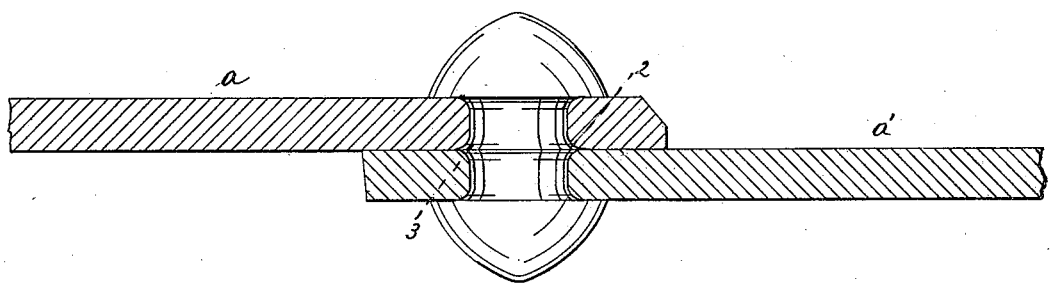
Fig. 2.    Fig. 3.
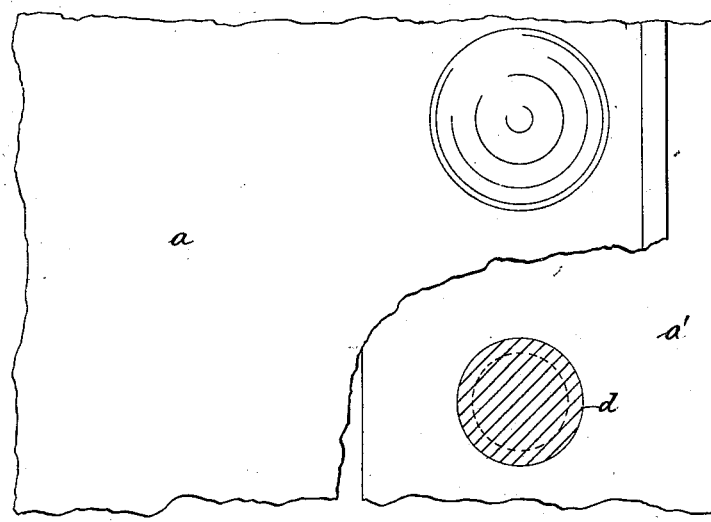 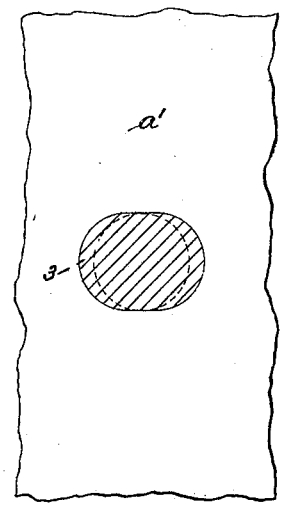
Witnesses.
Jos. P. Livermore.
L. F. Connor.
Inventor.
James R. Robinson
by Crosby & Gregory
Attys.

UNITED STATES PATENT OFFICE.

JAMES R. ROBINSON, OF CAMBRIDGE, MASSACHUSETTS.

MODE OF UNITING METAL PLATES BY RIVETING.

SPECIFICATION forming part of Letters Patent No. 230,964, dated August 10, 1880.

Application filed March 8, 1880. (No model.)

*To all whom it may concern:*

Be it known that I, JAMES R. ROBINSON, of Cambridge, county of Middlesex, State of Massachusetts, have invented an Improvement in Riveting Metal Plates, of which the following description, in connection with the accompanying drawings, is a specification.

My invention relates to improvements in riveting metal plates, and has for its object to increase the strength of the riveted joints of metal plates by so shaping the rivet-holes as to reduce the shearing-strain on the rivets without proportionally decreasing the sectional area of the joined plates between the rivet-holes, this construction also insuring that the riveted joints will gradually open when too great strain is brought upon them, and by such opening show that the joint is overstrained, and, in the case of a boiler-seam, relieve the pressure and prevent sudden and disastrous rupture.

My invention consists in countersinking or cutting away the edge of the metal on an incline around the rivet-holes on the faces of the plates that bear against one another, which I herein denominate the "lapping" faces, the same being in the shearing plane of the rivets, so that the rivets, when driven, shall preferably fill the said countersunk portion, and when formed in this way have a greatly increased area to resist shearing while there is not a corresponding decrease in the metal of the plate between the rivet-holes. The rivets, when properly formed in holes of this nature, afford an inclined surface or wedge, in bearing against which the jointed plates are caused to separate before the strain is sufficient to cause rupture. Forming the holes in this way rounds off the cutting-edges, which usually shear off the rivets, and thus reduces the shearing effect on them, changing it partly to a tensile strain, and at the same time causes the joint to open and show an overstrain before rupture takes place, and, in the case of a boiler, allows the seams to open and relieve the pressure, and thus prevent an explosion.

Figure 1 is a section of two metal plates joined by rivets in accordance with my invention, the rivet being shown in elevation; Fig. 2, a plan thereof, showing, also, a rivet in section, and Fig. 3 a modification.

The plates $a$ $a'$ are provided with rivet-holes in the usual manner by punching, or, preferably, drilling. The rivet-holes are then countersunk at each side of the plates, thus giving a surface inclined to the axis of the rivet-holes and removing the cutting-edge of the plate, thereby reducing the shearing action and causing the rivets to stretch and show an opening of the joint before rupture takes place.

As a proper shearing of a rivet must take place in the plane of the lapping faces of the plates, it will be observed that when the rivets are properly upset to fill the holes formed as described the area of this plane is greatly increased without a corresponding decrease of the metal between the rivet-holes.

In the proportions shown at $d$ in Fig. 2, the diameter of the larger circle being one-third greater than the small or dotted circle, the strength to resist shearing will be, to that of a rivet applied without countersinking the holes, as sixteen to nine.

The outer plate, $a$, in its tendency to tear away from the inner plate, $a'$, will bear against the inclined surface of the rivet at 2, which will tend to raise it from the plate $a'$, and in a like manner the plate $a'$ will press upon the inclined surface 3 and be started away from the plate $a$.

The first result of an overstrain upon a boiler riveted in this manner will be to open the seams, and thus allow the boiler to leak and relieve the pressure, and a sudden rupture or explosion cannot take place. The action thus described will bring a longitudinal strain on the rivets, which will have a tendency to break off the rivet-heads; but by countersinking or beveling the edges of the holes sufficiently at the outside of the plates the rivet-head is properly strengthened.

By beveling the edges of the metal about the rivet-holes only on the sides toward which the rivets bear, as shown in Fig. 3, the area of the plate between the rivet-holes is not reduced at all, but the other advantages hereinbefore described are obtained.

I do not claim enlarging or countersinking the rivet-holes beneath the heads of the rivets by itself, as I am aware that this has been previously practiced.

I claim—

1. That improvement in the art or method of riveting metal plates which consists in beveling the edge of the rivet-holes on the lapping faces of the said plates to increase the strength of the riveted joint and cause the plates to separate and open the seams before rupture takes place, substantially as and for the purpose described.

2. Metal plates to be lapped and riveted, provided with rivet-holes countersunk or beveled at their edges, combined with rivets to unite the said plates, substantially as described.

In testimony whereof I have signed my name to this specification in the presence of two subscribing witnesses.

JAMES R. ROBINSON.

Witnesses:
   JOS. P. LIVERMORE,
   N. E. C. WHITNEY.